United States Patent [19]

Ito et al.

[11] Patent Number: 4,954,175
[45] Date of Patent: Sep. 4, 1990

[54] PIGMENT

[75] Inventors: Hiroshi Ito, Ichinomiya; Junichi Handa, Toyota; Yoshio Takagi, Nagoya; Taketoshi Minohara, Toyota, all of Japan

[73] Assignee: Toyota Jidosha Kabushiki Kaisha, Toyota, Japan

[21] Appl. No.: 306,980

[22] Filed: Feb. 7, 1989

[30] Foreign Application Priority Data

Jul. 20, 1988 [JP] Japan .................................. 63-181215
Jan. 25, 1989 [JP] Japan .................................. 64-15385

[51] Int. Cl.$^5$ .............................................. C04B 14/20
[52] U.S. Cl. ..................................... 106/417; 427/304; 106/123; 106/126
[58] Field of Search .......................................... 106/417

[56] References Cited
PUBLICATIONS
98:127,778p, Toppan, 1983.

Primary Examiner—Theodore Morris
Attorney, Agent, or Firm—Finnegan, Henderson, Farabow, Garrett & Dunner

[57] ABSTRACT

A pigment comprises a substrate, a metallic layer formed on at least one surface of the substrate and imparting metallic luster, and a transparent inorganic compound layer formed on surfaces of the substrate and the metallic layer. Thereby, the pigment produces color by light interference of a ray reflected on a surface of the transparent inorganic compound layer and a ray passed through the transparent inorganic compound layer and reflected on a surface of the metallic layer. Thus, the pigment is excellent in coloring power and hiding power, and particularly useful for an automotive finishing paint.

11 Claims, 3 Drawing Sheets

PIGMENT

BACKGROUND OF THE INVENTION

1. Field of the Invention

The present invention relates to a pigment producing interference color. The pigment of the present invention is particularly useful for an automotive finishing paint.

2. Discussion of the Prior Art

A metallic paint containing aluminum flakes or other metal particles is very popular as a finishing paint for automobiles, domestic electric appliances, etc. The aluminum flakes, however, are low in lightness and hard to produce light colors. Therefore, pearl mica has been increasingly used in recent years.

Figure 8:
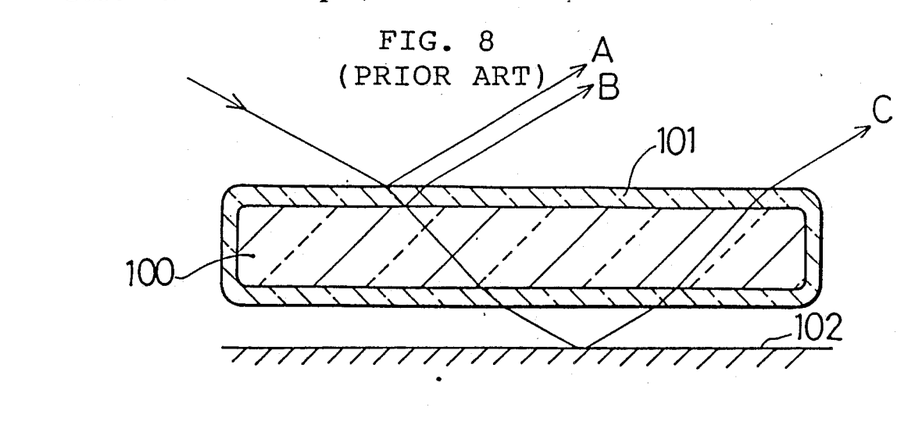
FIG. 8 is a schematic cross-sectional view of a conventional pearl mica.

The pearl mica has a structure in which a surface of mica 100 is covered with a titanium dioxide layer 101, as shown in FIG. 8. An incident ray on this pearl mica is divided into a ray A which is reflected on a surface of the titanium dioxide layer 101 and a ray which passes through the titanium dioxide layer 101. The ray passed through the titanium dioxide layer 101 is further divided into a ray B which is reflected on a surface of mica 100, and a ray which passes through mica 100. Reflected rays A and B produce various colors by light interference. For example, when the titanium dioxide layer 101 is 120-135 nm in thickness, pearl mica gives blue by light interference of rays A and B.

A part of the ray passing through the pearl mica reaches a surface of a base coat 102 and is then reflected on the base coat 102. The ray returns back through the pearl mica and exits as a reflected ray C out of the titanium dioxide layer 101 on the incident side. Because the reflected ray C and reflected ray B are mixed and produce white color, interference of the reflected rays A and B is lessened and the interference color is weakened.

Further, the pearl mica is poor in coloring power and hiding power. For example, an automotive metallic coating has been conventionally applied by using a metallic paint and a clear paint in a double-coating-single-curing operation. Thickness of the metallic paint film containing pearl mica at the time of complete hiding is generally 200 μm or more. When the metallic paint containing the pearl mica is applied by the conventional coating operation, color of a base coat is seen through the metallic paint film. Thus, uneven coating occurs here and there and is hard to be corrected.

Therefore, as disclosed in Japanese Unexamined Patent Publication (KOKAI) No. 215857/1984, it has been conducted to apply a colored intercoat which has the same or somewhat similar color to a given metallic paint containing pearl mica, and then apply the metallic paint containing pearl mica thereon. This method, however, requires as many intercoats as metallic paints and additional coating processes, and has resulted in increased production costs.

Figure 9:
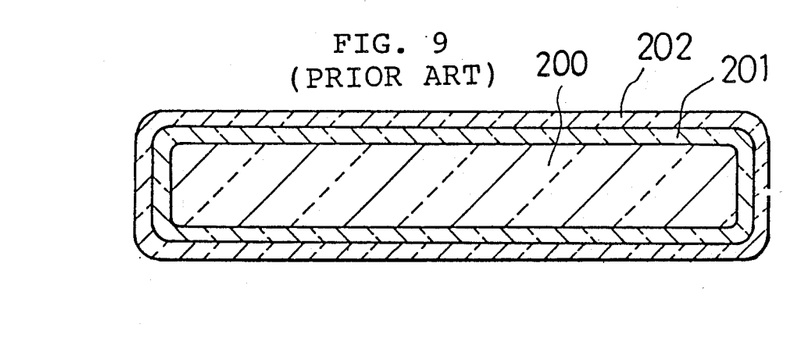
FIG. 9 is a schematic cross-sectional view of a conventional coloring mica.

In order to overcome the disadvantages of the pearl mica, a coloring mica has been considered. In the coloring mica, as shown in FIG. 9, a titanium dioxide layer 201 formed on pearl mica 200 is covered with an iron oxide layer 202 such as a $Fe_2O_3$ layer. This coloring mica gives interference color and inherent color of iron oxide. Accordingly, color power and hiding power of the paint film containing the coloring mica is much enhanced compared with that containing the pearl mica.

The coloring mica pigment offers various colors by changing thickness of the titanium dioxide layer 201 or changing crystal structure of the iron oxide layer 202. However, because the color of this pigment is based on the inherent color of iron oxide, color variety of the pigment is restricted in the range from red to yellow. Further, because the inherent color of iron oxide is turbid, the coloring mica pigment offers less clear color than the inteference color. Research and development have been conducted to add metals such as cobalt, copper, chromium, cadmium to mica pigments for the purpose of increasing the color variety, but have not reduced the paints into practical use because of toxicity and poor durability.

Figure 10:
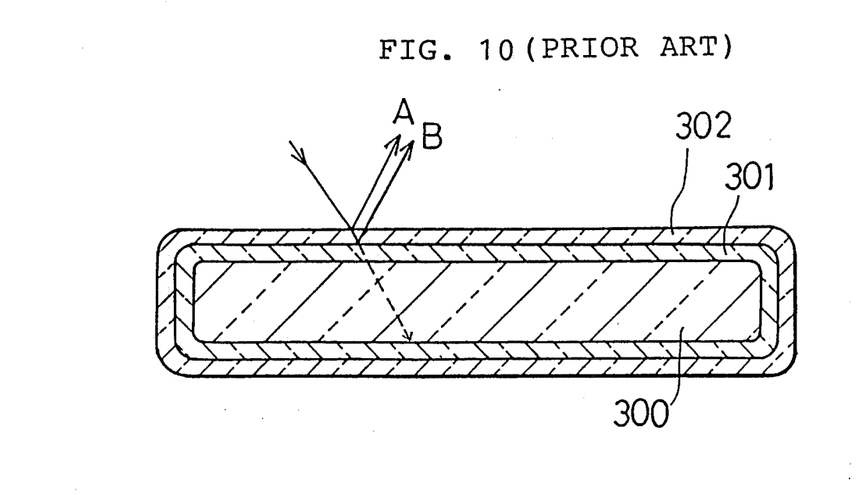
FIG. 10 is a schematic cross-sectional view of a conventional black pearl pigment.

On the other hand, as shown in FIG. 10, Japanese Unexamined Patent Publication (KOKAI) No. 60163/1985 discloses a pigment in which surface of mica 300 is coated with a titanium monoxide layer 301, and then a titanium dioxide layer 302 is formed thereon. Japanese Unexamined Patent Publication (KOKAI) No. 225264/1986 discloses a paint using this pigment. This pigment (hereinafter referred to as black pearl pigment) offers a less reflected ray C because the titanium monoxide layer 301 is dark brown and absorbs many rays passing through. Therefore, interference between reflected rays A and B is hardly disturbed by the ray C and produces strong interference color. The black pearl pigment produces clear color with strong coloring power and hiding power compared with the conventional pearl mica pigment.

The coloring power and hiding power of the black pearl pigment, however, are not strong enough to be used for an automotive finishing paint. Namely, even if the black pearl pigment is contained in the paint by the maximum amount without adversely affecting the paint film properties, the paint film thickness required for complete hiding is as high as 80-100 μm and it is not practical enough.

SUMMARY OF THE INVENTION

Accordingly, it is an object of the present invention to provide a pigment, long required in the field of automotive finishing paint, which produces strong interference color and which is excellent in coloring power and hiding power.

The pigment of the present invention comprises:

a substrate;

a metallic layer formed on at least one surface of the substrate and imparting metallic luster; and a transparent inorganic compound layer formed on surfaces of the substrate and the metallic layer, whereby the pigment produces color by light interference of a ray reflected on a surface of the transparent inorganic compound layer and a ray passed through the transparent inorganic compound layer and reflected on a surface of the metallic layer.

The substrate according to the present invention has a powder or scaly shape. The scaly shape is particularly preferred for the substrate, because the scaly-shape substrate orients in multi-layers in a wet paint film, and the resulting paint film can have excellent hiding power and flip-flop characteristic. The flip-flop characteristic means the shift in reflection color depending on angle of incidence and angle of observation. The substrate comprises any suitable material conventionally used in this art including natural mica, synthetic mica, glass flakes and molybdenum disulfide. Natural mica and synthetic mica are particularly preferred as the substrate. The substrate is preferably about 0.5–2 μm in thickness and 50 μm or less in mean particle diameter.

The metallic layer is formed on at least one surface of the substrate and imparting matallic luster. The metallic layer can be formed on only a part of the surface of the substrate, but preferably formed on the entire surface of the substrate. The metallic layer almost completely reflects light which passed through the transparent inorganic compound layer, thereby producing strong interference color. The metallic layer comprises a metal such as silver, gold, copper, palladium, nickel and cobalt, or an alloy such as an Ni-P alloy, an Ni-B alloy, an Ni-Co-P alloy, an Ni-W-P alloy, an Ag-Au alloy and a Co-P alloy. The substrate can be formed entirely by such a metal.

The transparent inorganic compound layer is formed on surfaces of the substrate and the metallic layer. The inorganic compound layer may preferably comprise titanium dioxide, iron oxide, aluminum hydroxide, chromium hydroxide or the like having a high index of refraction. For this reason, titanium dioxide is most preferred as the transparent inorganic compound layer. Various interference colors can be obtained by changing material and thickness of the transparent inorganic compound layer.

Metal dots or alloy dots may be formed on the transparent inorganic compound layer in a scattered manner. Metal dots or alloy dots contribute to produce strong interference color since intensity of light reflected on the surface of the inorganic compound layer is increased.

A method for producing the pigment according to the present invention comprises a first step of forming a metallic layer on a substrate such as mica, and a second step of forming an inorganic compound layer on surfaces of the substrate and the metallic layer. The first step may be carried out by a plating method such as electroplating and electroless plating, or a physical vapor deposition method such as vacuum evaporation and sputtering. The second step may be carried out by conventional methods. For example, an aqueous solution of inorganic salt is adhered on the surfaces of the substrate, then the water-containing layer is deposited by hydrosis, and finally the water-containing layer is heated at a certain temperature. When titanium dioxide is employed for the inorganic compound layer, it can be formed by a titanyl sulfate method disclosed for example in Japanese Patent Examined Publication (KOUKOKU) No. 25644/1968 or a titanium tetrachloride method and the like.

The present invention includes a pearl mica pigment in which a metallic layer is formed between the mica and the titanium dioxide layer. So, it may be taken into account to use pearl mica as a starting material for the pigment of the present invention. But it has been very difficult to form a metallic layer on the surface of mica through the outermost titanium dioxide layer. However, the inventors of the present invention have found after earnest studies that a metallic layer can be formed on a surface of mica through the titanium dioxide layer under special conditions, and established a method of forming the metallic layer utilizing this phenomenon. The method will be explained hereinafter.

First, a titanium dioxide layer of a predetermined thickness is formed on a surface of mica by the titanyl sulfate method or other known methods. This step may be omitted by using commercially available pearl mica.

Then, the pearl mica is treated by chrome plating, namely, depositing a chromium compound on the surface of the titanium dioxide layer. For example, as shown in U.S. Pat. No. 4,134,776, chromium hydroxide may be deposited by hydrolyzing a solution of water-soluble chromium salts such as chromium chloride and chromium sulfate. Or, as shown in German patent application No. P 32 03 017.1, chromium may be deposited as hydroxide, carbonate, phosphate or meta-acrylate complex by precipitating from a solution containing iron, manganese and chromium ions.

Next, the chrome plated pearl mica is subjected to electroless plating. The experiments conducted by the present inventors have shown, as described in detail later in the preferred embodiment, that a metallic layer is deposited not on the surface of the titanium dioxide layer but on an interface between the mica and titanium dioxide layer. The reasons have not been entirely understood, but it has been discovered that the chromium compound remarkably decreases rate of electroless plating, and the decreasing effect is assumed to greatly contribute to this phenomenon. Thus, the metallic layer can be formed on a surface of the substrate comprising mica. In alumina-treated mica or untreated mica, however, the metallic layer is not deposited on the interface.

The decreasing effect is varied by the amount of the deposited chromium compound. For example, when silver is plated as a metallic layer by electroless plating, the amount of the metal chromium contained in the deposited chromium compound should be from 0.05 to 5 wt % based on 100 wt % of pearl mica. When the amount of the metal chromium is less than 0.05 wt %, silver is deposited on the surface of the titanium dioxide layer and cannot produce desired interference color. When the amount of the deposited chromium compound is more than 5 wt %, the color of chromium affects the color of the paint film and makes it yellowish. Particularly, the amount of the metal chromium is most preferred to be from 0.15 to 0.30 wt %.

When silver is deposited on the interface for the metallic layer, silver may be deposited in a range of from 1 to 100 wt % based on 100 wt % of pearl mica. When silver is less than 1 wt %, the interference color is weak and the coloring power is poor. When silver is more than 100 wt %, silver particles having a mean diameter of several microns are deposited on the surface of the titanium dioxide layer, and desired color cannot be obtained. The range of 0.1–10 wt % is particularly preferred. In this range, the deposited silver particles have a mean diameter of 10–500 nm, and can produce the strongest inferference color.

Figure 1:
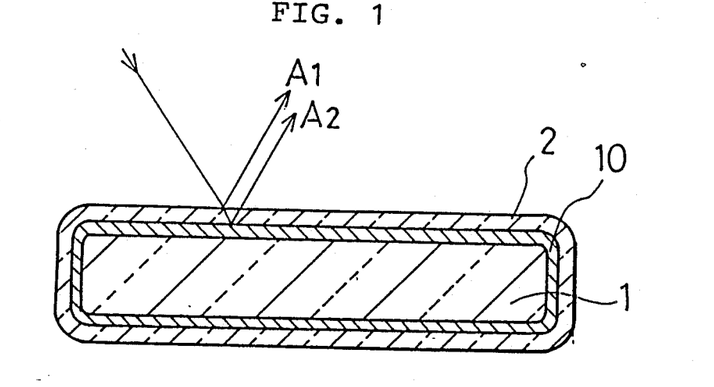
FIG. 1 is a schematic cross-sectional view of a pigment of a preferred embodiment of the present invention.
Figure 2:
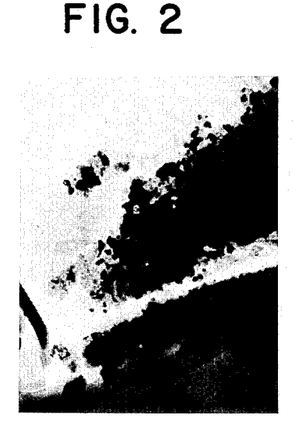
FIGS. 2-5 show shematic illustrations of microscopic photographs of sample pigment No. 5-C-3 of the preferred embodiment according to the present invention.
Figure 3:
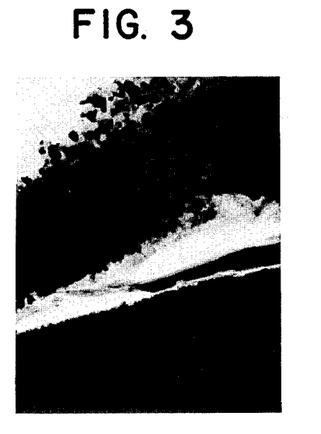
Figure 4:
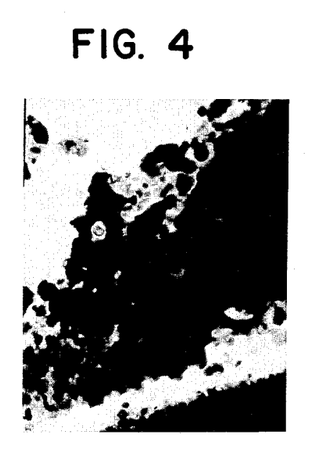
Figure 5:
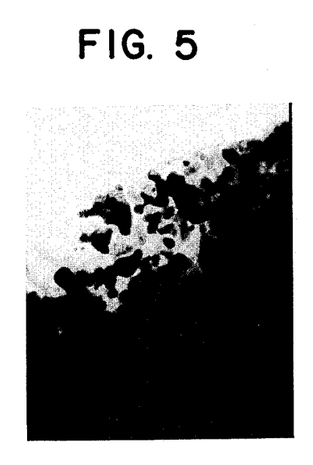

Hereinafter functions of the pigment according to the present invention will be explained with reference to FIG. 1.

The pigment according to the present invention comprises a substrate 1, a metallic layer 10 formed on at least one surface of the substrate 1, and a transparent inorganic compound layer 2 formed on surfaces of the substrate and the metallic layer. In this instance, the metallic layer 10 is formed on an entire surface of the substrate 1.

When a ray enters into the pigment, a part of the incident ray is reflected on a surface of the inorganic compound layer 2 as a reflected ray A1. The rest of the incident ray passes through the inorganic compound layer 2, is reflected on a surface of the metallic layer 10, and again passes through the inorganic compound layer 2 as a reflected ray A2. The reflected rays A1 and A2 produce interference color in accordance with an optical thickness (geometrical thickness multiplied by refractive index) of the inorganic compound layer 2. Because the metallic layer 10 of the present invention has metallic luster, almost all the ray which has passed through the inorganic compound layer 2 and reached the metallic layer 10 is reflected on the metallic layer without loss. Thus, the reflected ray A2 has the maximum intensity and achieves the maximum interference with the reflected ray A1, thereby producing the strong infererence color. When the metallic layer 10 is formed on all the surfaces of the substrate 1, no ray passes through the pigment and almost all the incident ray contributes to the interference. Thus, the strongest inferference color is obtained. The interference color can be varied by changing the thickness of the inorganic compound layer 2. Further, the metallic luster of the metallic layer 10 can be seen through the outermost surface of the pigment. Consequently, the pigment can be used as a metallic pigment having various colors.

General coloring pigments produces colors by absorption of lights. Mixture of three primary colors becomes almost black. As the primary colors are mixed more, the color saturation becomes lower. On the other hand, though the inherent color of the pigment of the present invention is achromatic color of metallic luster, the color of the pigment to be seen is produced by the light interference. Because the interference color is produced optically, the mixture of three primary colors becomes almost white. Namely, in the pigment of the present invention, the mixture of the three primary colors becomes almost the metallic color of the metallic layer and the color saturation does not decrease. Therefore, even if a plurality of colors are mixed in the pigment of the present invention, the color saturation is high and the color hue is clear.

As described above, strong coloring power and excellent hiding power are obtained in the pigment of the present invention, because the pigment of the present invention produces strong interference color which cannot be obtained by the conventional mica pigment. Also the pigment of the present invention can produce various colors by changing thickness of the inorganic compound layer, and can produce metallic paint films with vivid colors which have not been available before. Thus, the pigment of the present invention is significantly useful for an automotive finishing paint.

In the conventional metallic paint, various colors have been obtained by mixing organic pigments and aluminum flakes, however, color separation sometimes occurs due to difference in compositions and electrical properties of the pigment. Also, a method for producing the metallic paint by employing coloring pigments requires a step for dispersing the pigments by a ball mill or the like, and results in increased man-hour requirement. On the other hand, the pigment of the present invention never generates color separation, because the chemical composition of the pigment is the same even when a plurality of the primary colors are mixed. Also, the pigment of the present invention requires no dispersing step, and results in reduced man-hour requirement.

BRIEF DESCRIPTION OF THE DRAWINGS

The exact nature of this invention, as well as other objects and advantages thereof, will be readily apparent from consideration of the following description of preferred embodiments relating to the accompanying drawings, in which.

DETAILED DESCRIPTION OF THE PREFERRED EMBODIMENTS

A pigment of the preferred embodiment of the present invention comprises a mica 1 as the substrate, a silver layer 10 formed on all the surfaces of mica 1 as the metallic layer, and a titanium dioxide layer 2 formed on all the surfaces of the silver layer 10 as the transparent inorganic compound layer. The pigments of the preferred embodiment and the pigments of comparative examples will be explained in detail along with the producing methods thereof. Parts and percentages used herein mean parts by weight and percentages by weight.

[Producing Pearl Mica]

Commercially available mica flakes of about 0.5–1.0 $\mu$m in thickness and 10–50 $\mu$m in particle diameter were employed as the substrate, and a titanium dioxide layer was formed on the mica particles by a tytanyl sulfate method. More specifically, 150 g of mica particles were added to 750 ml of an aqueous solution of tytanyl sulfate containing 67% as titanium dioxide, and were rapidly heated and boiled for about 4.5 hours while refluxing. The resulting product was separated by filtering and by washing with water to pH5.0.

Six different amounts of the mica particles were added for forming six kinds of pearl mica having titanium dioxide layers with different thickness. The respective pearl mica thus obtained were embedded in resins, sliced by a microtome and examined through a transmission electron microscope for measuring thickness of the titanium dioxide layers.

Table 1 shows the thickness of the titanium dioxide layers along with hues of reflected and transmitted lights.

TABLE 1

| Sample No. | Thickness of TiO$_2$ layer(nm) | Hue Reflected light | Hue Transmitted light |
| --- | --- | --- | --- |
| 1-M | 20–40 | | silver |
| 2-M | 40–90 | yellow | purple |
| 3-M | 90–110 | red | blue |
| 4-M | 110–120 | reddish purple | green |
| 5-M | 120–135 | blue | orange |
| 6-M | 135–155 | green | red |

[Chrome-Plating]

Each pearl mica was dispersed in 100 g of distilled water to obtain a suspension. Then, 100 ml of an aqueous solution cotaining 92 g of $FeSO_4.7H_2O$, 17 g of $KCr(SO_4)_2.12H_2O$ and 100 ml of an aqueous solution containing 1.5 g of $NaH_2PO_4. 2H_2O$ were added to the suspension at 50° C. for 60 minutes. The pH of the suspension was controlled at 4.5 by adding a 2% NaOH aqueous solution during the addition. After the addition, the 2% NaOH aqueous solution was added to increase the pH to 5.0 and the suspension was stirred for 60 minutes. Then, the suspension was filtered and the obtained material was washed and dried at 130° C. In this case, chromium phosphate as the chromium compound was deposited on the pearl mica. The amounts and time required for adding the two aqueous solutions to the suspension for the chrome-plating were varied to produce four kinds of chrome-plated pearl mica with different amounts of deposited chromium compounds. The four kinds of chrome-plated pearl mica were respectively examined on the amount of deposited chromium compounds by plasma element analysis. The results of the analysis are shown in Table 2. The four kinds of the chrome-plating conditions i.e., the four addition conditions were applied to each of the aforementioned six pearl micas. Thus, a total of 24 kinds of chrome-plated pearl micas were prepared. Also, pearl mica free from the chrome-plating and alumina plated pearl mica were also prepared for comparison. Table 2 also lists the sample numbers.

TABLE 2

| Treatment | Deposited amount (wt %) | Sample No. | | | | | |
|---|---|---|---|---|---|---|---|
| | | 1-M | 2-M | 3-M | 4-M | 5-M | 6-M |
| chrome- | 0.10 | 1-C-1 | 2-C-1 | 3-C-1 | 4-C-1 | 5-C-1 | 6-C-1 |
| plating | 0.20 | 1-C-2 | 2-C-2 | 3-C-2 | 4-C-2 | 5-C-2 | 6-C-2 |
| | 0.30 | 1-C-3(*) | 2-C-3(*) | 3-C-3(*) | 4-C-3(*) | 5-C-3(*) | 6-C-3(*) |
| | 0.50 | 1-C-4 | 2-C-4 | 3-C-4 | 4-C-4 | 5-C-4 | 6-C-4 |
| none | — | 1-A-1 | 2-A-1 | 3-A-1 | 4-A-1 | 5-A-1(*) | |
| alumina-plating | 0.50 | 1-A-2 | 2-A-2 | 3-A-2 | 4-A-2 | 5-A-2 | |

[Formation of Metallic Layer]

15 g of each sample shown in Table 2 was dispersed and stirred in 450 ml of distilled water to obtain a suspension. 30 ml of silver solution, which was prepared by adding 50 g of $AgNO_3$ and 50 ml of an aqueous solution of 28% ammonia to distilled water to make a total of 1 l of the solution, was added to the suspension all at once at room temperature, and stirred for 5 minutes. Then 20 ml of formalin solution, which was prepared by adding 9 ml of a solution of 35% formalin to distilled water to make a total of 40 ml of the solution, was added all at once, and stirred for 55 minutes. Thus, electroless plating was carried out. The suspension was filtered and the filtered material was washed and dried at 120° C. to obtain 36 kinds of pigments of the present invention and the comparative examples. The same sample numbers as shown in Table 2 were assigned to the pigments thus obtained.

Seven samples marked with asterisk (*) shown in Table 2 were subjected to electroless plating by using 30 ml of two types of silver solutions which contained 100 g and 300 g of $AgNO_3$ in 1 l, respectively, to obtain 14 pigments. Sample numbers of these pigments were shown in Table 3. Also, black pearl pigments of red, green, and black disclosed in Japanese Unexamined Patent Publication (KOKAI) No. 225264/1986 were selected. Sample numbers of these black pearl pigments are B-1, B-2, and B-3, respectively.

TABLE 3

| Sample No. | 1-C-3 | 2-C-3 | 3-C-3 | 4-C-3 | 5-C-3 | 6-C-3 | 5-A-1 |
|---|---|---|---|---|---|---|---|
| $AgNO_3$ 100 g | 1-C-3-D-1 | 2-C-3-D-1 | 3-C-3-D-1 | 4-C-3-D-1 | 5-C-3-D-1 | 6-C-3-D-1 | 5-A-1-D-1 |
| $AgNO_3$ 300 g | 1-C-3-D-2 | 2-C-3-D-2 | 3-C-3-D-2 | 4-C-3-D-2 | 5-C-3-D-1 | 5-C-3-D-2 | 5-A-1-D-2 |

[Pigment Structure Analysis]

The structure of the pigment of sample No. 5-C-3 was analyzed with the transmission electron microscope. FIGS. 2-5 show the microscopic photographs of the surface of the mica 1 and the side view of the titanium dioxide layer 2. The titanium dioxide layer 2 and the mica 1 have been separated.

Figure 6:
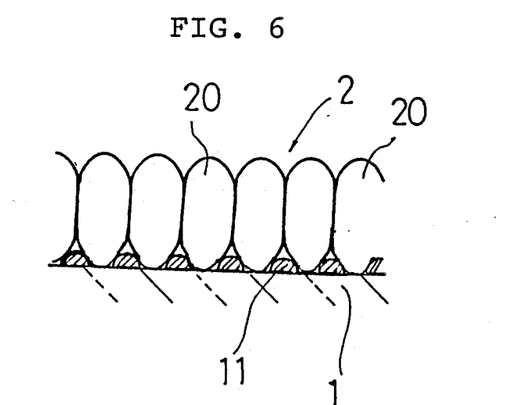
FIG. 6 is an enlarged cross-sectional view of a part of the pigment of the preferred embodiment of the present invention.
Figure 7:
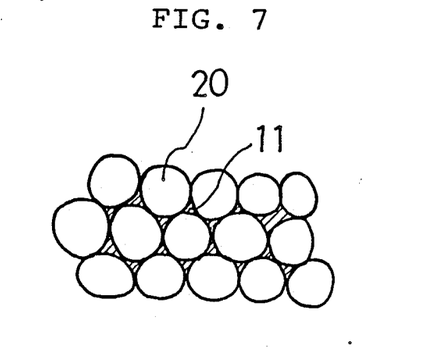
FIG. 7 is an enlarged plan view of the part of the pigment of the preferred embodiment of the present invention.

The titanium dioxide layer 2 was observed, as schematically shown in FIGS. 6 and 7, that columnar titanium dioxide particles 20 of 10-100 nm in height and 2-5 nm in mean diameter were arranged orderly. The surface of mica 1 were observed that it comprises concentrically circular portions free from deposition and the silver particles 11 deposited around the concentrically circular portions. This was supposed to indicate that the silver particles 11 were deposited around the titanium dioxide particles 20. Thus, as shown in FIGS. 6 and 7, it is assumed that the silver particles 11 were deposited between the titanium dioxide layer 2 and the mica 1, and more specifically on the gaps between the titanium dioxide particles 2.

[Production of Paint]

The aforementioned fifty-three samples and the six pearl micas shown in Table 1 which were neither chrome plated nor silver plated were employed, and the compositions shown below (all were solid except for organic solvent) were mixed, and stirred to disperse with a high speed disperser, thereby obtaining base metallic paints.

| | |
|---|---|
| sample pigment | 3.20% |
| acrylic resin | 18.78% |
| melamine resin | 8.05% |
| suspending agent | 1.96% |
| additive | 0.42% |
| organic solvent | 67.59% |
| total | 100.00% |

The acrylic resin employed had the following monomer composition, and made to a resin of weight average molecular weight (Mw) of 27,000 and number of average molecular weight (Mn) of 12,000.

| | |
|---|---|
| stylene | 20.0% |
| n-butyl methacrylate | 15.0% |
| ethyl hexyl metacrylate | 20.0% |
| stearyl metacrylate | 15.0% |
| butyl acrylate | 13.5% |
| hydroxy metacrylate | 15.0% |
| methacrylic acid | 1.5% |
| total | 100.0% |

TABLE 4-1

| Sample No. | CH l* | CH a* | CH b* | MCH l* | MCH a* | MCH b* |
|---|---|---|---|---|---|---|
| 1-C-1 | 39.61 | −1.76 | −1.06 | 58.26 | −2.00 | −3.10 |
| 1-C-2 | 38.05 | −1.20 | −0.90 | 56.25 | −1.50 | −2.80 |
| 1-C-3 | 34.08 | −1.18 | −3.86 | 54.51 | −2.03 | −6.54 |
| 1-C-4 | 29.91 | −1.04 | −3.39 | 50.93 | −1.35 | −5.67 |
| 2-C-1 | 32.10 | 0.60 | 7.30 | 46.09 | 1.70 | 16.20 |
| 2-C-2 | 30.15 | 0.77 | 9.65 | 45.34 | 1.87 | 17.87 |
| 2-C-3 | 29.20 | 1.34 | 10.97 | 45.21 | 2.12 | 18.90 |
| 2-C-4 | 28.37 | 1.49 | 12.22 | 45.10 | 2.22 | 20.06 |
| 3-C-1 | 25.43 | 4.99 | 5.30 | 32.90 | 9.60 | −4.30 |
| 3-C-2 | 23.42 | 5.74 | 6.44 | 32.23 | 9.71 | −4.45 |
| 3-C-3 | 20.31 | 6.18 | 5.14 | 30.41 | 11.30 | −6.04 |
| 3-C-4 | 18.58 | 6.64 | 3.40 | 29.71 | 11.56 | −6.85 |
| 4-C-1 | 25.20 | 3.70 | −2.10 | 32.05 | 9.05 | −12.10 |
| 4-C-2 | 23.42 | 3.89 | −2.29 | 31.48 | 9.41 | −13.22 |
| 4-C-3 | 20.24 | 4.98 | −3.71 | 29.77 | 10.63 | −14.70 |
| 4-C-4 | 18.75 | 5.23 | −4.65 | 28.99 | 11.27 | −15.52 |
| 5-C-1 | 25.90 | −0.63 | −6.90 | 36.80 | −3.32 | −18.08 |
| 5-C-2 | 24.84 | −0.62 | −7.59 | 36.94 | −3.34 | −19.08 |
| 5-C-3 | 22.39 | −0.68 | −8.96 | 35.56 | −3.85 | −20.38 |
| 5-C-4 | 21.46 | −1.54 | −10.16 | 35.00 | −4.13 | −21.14 |
| 6-C-1 | 29.05 | −2.50 | 3.05 | 43.90 | −9.00 | 9.30 |
| 6-C-2 | 28.32 | −2.73 | 3.68 | 43.46 | −9.28 | 9.48 |
| 6-C-3 | 25.75 | −3.25 | 4.51 | 42.66 | −9.92 | 10.58 |
| 6-C-4 | 24.59 | −3.84 | 4.59 | 42.26 | −10.34 | 10.91 |

TABLE 4-2

| Sample No. | CH l* | CH a* | CH b* | MCH l* | MCH a* | MCH b* |
|---|---|---|---|---|---|---|
| 1-A-1 | 45.78 | −2.90 | −4.87 | 55.76 | −3.13 | −6.14 |
| 1-A-2 | 41.05 | −1.80 | −4.50 | 53.20 | −3.09 | −5.80 |
| 1-M | 56.01 | −0.20 | −0.05 | 57.50 | −0.20 | −0.05 |
| 2-A-1 | 52.02 | 2.44 | 21.53 | 58.06 | 1.26 | 22.65 |
| 2-A-2 | 51.03 | 2.00 | 20.43 | 57.06 | 1.00 | 21.05 |
| 2-M | 59.23 | −0.76 | −3.58 | 68.16 | 0.73 | 6.75 |
| 3-A-1 | 42.67 | 11.76 | 6.37 | 48.04 | 13.91 | 2.65 |
| 3-A-2 | 41.30 | 10.98 | 5.99 | 43.05 | 12.22 | 2.55 |
| 3-M | 63.09 | 0.87 | 0.29 | 65.73 | 6.41 | −0.91 |
| 4-A-1 | 39.57 | 10.98 | −9.05 | 46.79 | 12.85 | −15.01 |
| 4-A-2 | 38.79 | 11.90 | −9.00 | 45.79 | 11.70 | −14.99 |
| 4-M | 61.86 | −0.45 | −2.01 | 63.76 | 5.86 | −11.76 |
| 5-A-1 | 46.00 | −3.83 | −16.26 | 51.99 | −4.71 | −19.07 |
| 5-A-2 | 45.88 | −3.77 | −15.99 | 51.00 | −4.66 | −18.85 |
| 5-M | 61.78 | −1.02 | −1.63 | 66.37 | −3.82 | −12.59 |
| 6-A-1 | 46.34 | −6.38 | 7.61 | 57.06 | −10.88 | 12.89 |
| 6-A-2 | 61.44 | −2.21 | 0.98 | 67.80 | −5.98 | 3.55 |
| 6-M | 63.55 | −2.36 | 1.00 | 68.97 | −6.03 | 3.76 |
| 1-C-3-D-1 | 29.05 | −1.02 | −3.11 | 49.50 | −1.21 | −5.13 |
| 1-C-3-D-2 | 25.31 | −0.93 | −2.78 | 44.12 | −1.33 | −4.98 |
| 2-C-3-D-1 | 28.10 | 1.31 | 11.15 | 43.10 | 2.01 | 18.06 |
| 2-C-3-D-2 | 26.10 | 1.45 | 10.95 | 41.91 | 2.04 | 17.99 |
| 3-C-3-D-1 | 18.40 | 6.50 | 3.31 | 27.99 | 11.41 | −6.71 |
| 3-C-3-D-2 | 17.95 | 6.43 | 3.09 | 27.12 | 11.32 | −5.96 |
| 4-C-3-D-1 | 18.71 | 5.11 | −4.52 | 27.12 | 11.12 | −15.43 |
| 4-C-3-D-2 | 17.91 | 5.07 | −4.12 | 26.09 | 10.98 | −15.36 |
| 5-C-3-D-1 | 21.32 | −1.48 | −10.02 | 34.71 | −3.92 | −21.02 |
| 5-C-3-D-2 | 20.13 | −1.22 | −9.41 | 33.99 | −3.54 | −20.95 |
| 6-C-3-D-1 | 24.12 | −3.50 | 4.12 | 41.12 | −9.52 | 10.72 |
| 6-C-3-D-2 | 22.09 | −2.98 | 3.76 | 40.09 | −8.21 | 9.98 |
| 5-A-1-D-1 | 43.72 | −2.99 | −13.21 | 50.09 | −4.21 | −17.62 |
| 5-A-1-D-2 | 41.11 | −2.81 | −11.95 | 49.01 | −3.88 | −17.00 |
| B-1 | 37.74 | 1.11 | −4.72 | 47.86 | 10.83 | −10.01 |
| B-2 | 41.58 | −8.25 | −0.11 | 50.77 | −13.03 | 6.30 |
| B-3 | 35.18 | −5.89 | −11.68 | 43.89 | −8.3 | −22.69 |

TABLE 5-1

| Sample No. | Black & white hiding film thickness | 40° C. water resistance test | 80° C. water resistance test | ΔE after QUV test |
|---|---|---|---|---|
| 1-C-1 | 46 | excellent | excellent | 0.41 |
| 1-C-2 | 48 | excellent | excellent | 0.38 |
| 1-C-3 | 42 | excellent | excellent | 0.22 |
| 1-C-4 | 44 | excellent | excellent | 0.43 |
| 2-C-1 | 41 | excellent | excellent | 0.21 |
| 2-C-2 | 39 | excellent | excellent | 0.25 |
| 2-C-3 | 45 | excellent | excellent | 0.41 |
| 2-C-4 | 42 | excellent | excellent | 0.50 |
| 3-C-1 | 39 | excellent | excellent | 0.33 |
| 3-C-2 | 38 | excellent | excellent | 0.38 |
| 3-C-3 | 37 | excellent | excellent | 0.21 |
| 3-C-4 | 39 | excellent | excellent | 0.31 |
| 4-C-1 | 39 | excellent | excellent | 0.40 |
| 4-C-2 | 38 | excellent | excellent | 0.51 |
| 4-C-3 | 37 | excellent | excellent | 0.49 |
| 4-C-4 | 37 | excellent | excellent | 0.28 |
| 5-C-1 | 37 | excellent | excellent | 0.61 |
| 5-C-2 | 36 | excellent | excellent | 0.23 |
| 5-C-3 | 37 | excellent | excellent | 0.41 |
| 5-C-4 | 38 | excellent | excellent | 0.18 |
| 6-C-1 | 41 | excellent | excellent | 0.55 |
| 6-C-2 | 38 | excellent | excellent | 0.48 |
| 6-C-3 | 40 | excellent | excellent | 0.45 |
| 6-C-4 | 42 | excellent | excellent | 0.41 |

TABLE 5-2

| Sample No. | Black & white hiding film thickness | 40° C. water resistance test | 80° C. water resistance test | ΔE after QUV test |
|---|---|---|---|---|
| 1-A-1 | 82 | fair | poor | 1.39 |

TABLE 5-2-continued

| Sample No. | Black & white hiding film thickness | 40° C. water resistance test | 80° C. water resistance test | ΔE after QUV test |
| --- | --- | --- | --- | --- |
| 1-A-2 | 88 | good | fair | 1.11 |
| 1-M | 390 | excellent | excellent | 0.51 |
| 2-A-1 | 79 | fair | poor | 1.55 |
| 2-A-2 | 78 | good | fair | 1.23 |
| 2-M | 410 | excellent | excellent | 0.42 |
| 3-A-1 | 77 | fair | poor | 1.99 |
| 3-A-2 | 76 | good | fair | 1.34 |
| 3-M | 380 | excellent | excellent | 0.38 |
| 4-A-1 | 75 | fair | poor | 2.23 |
| 4-A-2 | 74 | good | fair | 1.43 |
| 4-M | 320 | excellent | excellent | 0.23 |
| 5-A-1 | 79 | fair | poor | 2.11 |
| 5-A-2 | 78 | good | fair | 1.33 |
| 5-M | 400 | excellent | excellent | 0.49 |
| 6-A-1 | 72 | fair | poor | 2.33 |
| 6-A-2 | 77 | good | fair | 1.32 |
| 6-M | 350 | excellent | excellent | 0.43 |

TABLE 5-3

| Sample No. | Black & white hiding film thickness | 40° C. water resistance test | 80° C. water resistance test | ΔE after QUV test |
| --- | --- | --- | --- | --- |
| 1-C-3-D-1 | 41 | excellent | excellent | 0.42 |
| 1-C-3-D-2 | 24 | excellent | excellent | 0.38 |
| 2-C-3-D-1 | 38 | excellent | excellent | 0.33 |
| 2-C-3-D-2 | 22 | excellent | excellent | 0.41 |
| 3-C-3-D-1 | 37 | excellent | excellent | 0.28 |
| 3-C-3-D-2 | 21 | excellent | excellent | 0.31 |
| 4-C-3-D-1 | 36 | excellent | excellent | 0.45 |
| 4-C-3-D-2 | 22 | excellent | excellent | 0.46 |
| 5-C-3-D-1 | 35 | excellent | excellent | 0.44 |
| 5-C-3-D-2 | 19 | excellent | excellent | 0.39 |
| 6-C-3-D-1 | 39 | excellent | excellent | 0.38 |
| 6-C-3-D-2 | 23 | excellent | excellent | 0.32 |
| 5-A-1-D-1 | 65 | fair | poor | 1.73 |
| 5-A-1-D-2 | 63 | good | fair | 1.95 |
| B-1 | 93 | fair | poor | 2.23 |
| B-2 | 95 | fair | poor | 2.41 |
| B-3 | 101 | fair | poor | 7.85 |

The melamine resin employed was n-butyl melamine resin ('u-van 20SE' produced by Mitsui Touatsu Chemical Co., Ltd.), and the suspending agent employed was amide wax. Concentration of mica pigment was 10% by weight.

[Colorimetry]

The paints obtained from respective pigment samples were applied on the surface of the gray-color intercoat film by a bar coater, baked and dried to be 15 μm in thickness when the film was dried. The color of the paint film thus coated was measured by a colorimeter ('SM-3' produced by Suga Testing Machine Co., Ltd.), and the values L*, a*, b* (L*:lightness index, a*, b*:chromaticness indexes) are shown in Table 4. Colorimetry was conducted on both MCH which corresponds to the color viewed at the front and CH which corresponds to the color viewed in an oblique direction.

[Hiding Power]

Respective paints were applied on a black and white paper for testing hiding power by changing film thickness. Table 5 shows the hiding film thickness, i.e., the film thickness at which black and white cannot be identified.

[Characteristics of Paint Film]

In order to prepare test pieces, each metallic paint was applied by air spray, on a steel plate which had been coated with an electrodeposited coat and an intercoat film, so that the metallic paint film thickness was 15 μm when dried. After several minutes of flash-off time, acrylmelamine resin clear paint was applied by air spray on the metallic paint film in a wet-on-wet manner so that the clear paint film thickness was 35 μm. Then, the test piece was baked at 140° C. for 23 minutes. Compositions of the clear paint and the acrylic resin used in the clear paint are shown below.

| <Clear Paint Composition> | |
| --- | --- |
| acrylic resin | 38.25% |
| melamine resin | 16.40% |
| additive | 1.24% |
| organic solvent | 45.11% |
| total | 100.00% |

| <Acrylic resin Composition> | |
| --- | --- |
| stylene | 30.0% |
| n-butyl methacrylate | 15.0% |
| ethyl acrylate | 20.0% |
| butyl acrylate | 17.5% |
| hydroxyl ethyl methacrylate | 15.0% |
| acrylic acid | 2.5% |
| total | 100.0% |

Mw = 16000  Mn = 7000

The test pieces thus obtained were examined on water resistance and weather resistance. Water resistance tests were carried out under two different conditions. One was conducted by immersing the test pieces in warm water of 40° C. for 10 days. The other was conducted by immersing the test pieces in hot water of 80° C. for 10 days. The appearances of the coated surfaces of the test pieces were visually inspected. The weather resistance test was conducted by subjecting the test pieces to a Cyclic Ultraviolet Weathering Tester (QUV) for 500 hours, and the colors before and after the weather test was measured by the colorimeter. The results of the water resistance tests and the weather resistance test are also shown in Table 5.

[Evaluation]

When the pigment concentration by weight was 10%, the pigments of the preferred embodiments according to the present invention (referred to as "C" series) had the black-and-white hiding film thickness of 21–48 μm, while the black pearl pigments (referred to as "B" series) had the black-and-white hiding film thickness of 93–101 μm and the pearl micas (referred to as "M" series) had the black-and-white hiding film thickness of 320–410 μm. It is apparent that the pigments of the present invention are excellent in coloring power and hiding power.

The pigments of C series had color degradation after the weather resistance test as low as that of the pearl micas. It was not observed that chrome-plating and silver-plating had deteriorated the weather resistance. The pigments of the present invention maintain the excellent properties. The pigments of C series were excellent in water resistance and weather resistance compared with the pigments of A series free from chrome-plating. It is apparent that chrome-plating improves water and weather resistances of the pigments.

Moreover, the pigments of C series showed big difference between MCH and CH, and offered excellent flip-flop characteristic. Also, as apparent from the black-and-white hiding film thickness of D series, the black-and-white hiding film thickness decreased as the amount of the silver plating increased. This is because the ratio of the ray totally reflected on the surface of the silver plating layer to the incident ray on the pigment increases and the interference increases accordingly.

The pearl mica free from chrome-plating and the pearl mica with alumina treatment, which were both subjected to the silver plating, of A series exhibited less flip-flop characteristic and greater black-and-white hiding film thickness, compared with the chrome-plated pigments of C series. Although no illustration is provided herein, observation with the microscope showed that silver particles were deposited on the surface of the titanium dioxide layer.

Therefore, the pigments of C series according to the present invention are satisfactorily applicable to an automotive finishing paint.

TABLE 6-1

| RATIO OF MIXTURE | | CH | | | | MCH | | | |
|---|---|---|---|---|---|---|---|---|---|
| | | 100/0 | 75/25 | 50/50 | 25/75 | 100/0 | 75/25 | 50/50 | 25/75 |
| 3-C-3/2-C-3 | L* | 28.26 | 29.04 | 30.60 | 30.92 | 40.77 | 43.19 | 45.71 | 47.69 |
| | a* | 5.62 | 4.85 | 3.66 | 2.09 | 11.32 | 8.17 | 5.36 | 2.94 |
| | b* | 5.70 | 7.51 | 9.02 | 10.36 | 3.35 | 8.44 | 12.71 | 16.62 |
| 3-C-3/6-C-3 | L* | | 29.48 | 30.85 | 32.07 | | 43.64 | 45.80 | 48.39 |
| | a* | | 3.64 | 1.91 | −0.31 | | 5.13 | −0.86 | −5.93 |
| | b* | | 5.96 | 5.78 | 5.84 | | 5.86 | 8.15 | 9.89 |
| 2-C3/6-C-3 | L* | 32.43 | 31.91 | 32.48 | 32.69 | 50.18 | 49.73 | 49.99 | 50.18 |
| | a* | 1.38 | 0.70 | −0.14 | −1.04 | 1.18 | −1.66 | −4.26 | −8.00 |
| | b* | 11.72 | 9.58 | 8.00 | 6.91 | 20.33 | 18.20 | 15.83 | 13.73 |
| 2-C-3/5-C-3 | L* | | 30.85 | 29.31 | 27.46 | | 48.01 | 45.32 | 42.10 |
| | a* | | 1.57 | 1.53 | 0.75 | | 0.46 | −0.39 | −1.70 |
| | b* | | 7.94 | 4.00 | −0.94 | | 12.52 | 3.44 | −6.29 |
| 6-C3/5-C-3 | L* | 34.16 | 31.68 | 29.83 | 27.55 | 50.92 | 47.95 | 44.94 | 41.92 |
| | a* | −1.68 | −1.00 | −0.74 | 0.33 | −10.43 | −8.87 | −7.93 | −5.87 |
| | b* | 5.28 | 3.19 | 0.84 | −2.11 | 11.45 | 5.06 | −1.68 | −8.69 |
| 5-C-3/3-C-3 | L* | 26.41 | 26.26 | 26.77 | 28.01 | 38.61 | 39.21 | 39.60 | 40.03 |
| | a* | 1.04 | 2.22 | 3.71 | 4.58 | −3.54 | 0.56 | 4.44 | 8.74 |
| | b* | −4.81 | −1.06 | 1.27 | 3.55 | −15.73 | −11.30 | −6.66 | −2.06 |

TABLE 6-2

| RATIO OF MIXTURE | | CH | | | | MCH | | | |
|---|---|---|---|---|---|---|---|---|---|
| | | 100/0 | 75/25 | 50/50 | 25/75 | 100/0 | 75/25 | 50/50 | 25/75 |
| A/5-C-3 | L* | 31.01 | 29.79 | 28.30 | 27.42 | 45.89 | 44.13 | 41.98 | 40.58 |
| | a* | 1.55 | 1.08 | 0.99 | 1.16 | −0.36 | −0.79 | −1.54 | −2.03 |
| | b* | 5.68 | 3.21 | 0.65 | −1.41 | 7.95 | 1.75 | −4.31 | −9.58 |
| A/2-C-3 | L* | | 31.10 | 32.18 | 31.52 | | 46.86 | 47.83 | 78.70 |
| | a* | | 1.53 | 1.31 | 1.19 | | 0.06 | 0.51 | 0.79 |
| | b* | | 7.12 | 9.17 | 9.98 | | 11.35 | 14.65 | 17.68 |
| B/3-C-3 | L* | 30.41 | 29.88 | 29.79 | 28.97 | 45.19 | 44.00 | 42.83 | 41.46 |
| | a* | −0.85 | 0.70 | 2.18 | 3.89 | −7.30 | −2.77 | 1.82 | 6.67 |
| | b* | 1.33 | 2.47 | 3.39 | 4.79 | −1.12 | 0.13 | 0.95 | 2.10 |
| B/2-C-3 | L* | | 30.06 | 31.85 | 31.60 | | 46.23 | 47.52 | 48.52 |
| | a* | | −0.07 | 0.02 | 1.09 | | −4.51 | −2.22 | −0.57 |
| | b* | | 3.67 | 6.58 | 8.75 | | 4.73 | 10.23 | 15.36 |
| C/6-C-3 | L* | 27.62 | 29.33 | 30.76 | 31.60 | 39.26 | 42.64 | 45.19 | 47.81 |
| | a* | 2.73 | 1.92 | 0.54 | −0.64 | 5.19 | 0.42 | −3.52 | |
| | b* | 1.51 | 2.43 | 3.63 | 4.23 | −7.02 | −1.60 | 2.91 | |
| C/2-C-3 | L* | | 28.40 | 29.97 | 31.27 | | 42.55 | 45.19 | 47.50 |
| | a* | | 2.53 | 1.78 | 1.84 | | 3.97 | 2.86 | 2.11 |
| | b* | | 4.01 | 6.32 | 8.76 | | 0.88 | 8.05 | 14.71 |

TABLE 6-3

| RATIO OF MIXTURE | | CH | | | | MCH | | | |
|---|---|---|---|---|---|---|---|---|---|
| | | 100/0 | 75/25 | 50/50 | 25/75 | 100/0 | 75/25 | 50/50 | 25/75 |
| D/3-C-3 | L* | 28.78 | 28.59 | 28.78 | 28.40 | 44.65 | 43.65 | 42.72 | 41.71 |
| | a* | 1.28 | 2.10 | 3.19 | 3.68 | 0.11 | 2.63 | 5.69 | |
| | b* | 4.08 | 4.34 | 5.06 | 5.83 | 3.05 | 3.13 | 3.13 | |
| D/6-C-3 | L* | | 30.06 | 32.09 | 32.50 | | 46.20 | 47.99 | 49.33 |
| | a* | | 0.30 | −0.02 | −0.41 | | 2.49 | | |
| | b* | | 4.40 | 4.74 | 4.76 | | 5.21 | 7.20 | 40.0 |
| E/5-C-3 | L* | 30.58 | 28.68 | 28.11 | 26.71 | 45.89 | 43.76 | 42.29 | 2.11 |
| | a* | 3.05 | 2.46 | 2.21 | 1.73 | 5.79 | 4.21 | 2.15 | |
| | b* | 8.98 | 5.70 | 2.74 | −0.25 | 12.74 | 5.55 | −1.00 | |
| E/6-C-3 | L* | | 30.32 | 31.43 | 32.26 | | 46.64 | 47.84 | 49.01 |
| | a* | | 1.70 | 0.43 | −0.72 | | 1.67 | −2.22 | −6.93 |
| | b* | | 7.72 | 6.96 | 6.05 | | 13.49 | 12.30 | 11.89 |
| F/5-C-3 | L* | 32.26 | 30.50 | 29.61 | 28.01 | 50.00 | 47.36 | 44.96 | 41.75 |
| | a* | −0.04 | 0.23 | 0.37 | 0.24 | −3.38 | −3.57 | −3.19 | −3.05 |
| | b* | 7.64 | 5.16 | 2.72 | −0.74 | 15.67 | 7.84 | 0.77 | −7.87 |
| F/3-C-3 | L* | | 31.10 | 30.23 | 30.06 | | 47.85 | 45.74 | 43.45 |
| | a* | | 0.83 | 2.44 | 3.20 | | −0.58 | 3.05 | 7.02 |
| | b* | | 7.50 | 7.17 | 6.87 | | 13.34 | 10.17 | 7.05 |

TABLE 6-4

| RATIO OF MIXTURE | | CH | | | | | MCH | | | | |
|---|---|---|---|---|---|---|---|---|---|---|---|
| | | 100/0 | 75/25 | 50/50 | 25/75 | 0/100 | 100/0 | 75/25 | 50/50 | 25/75 | 0/100 |
| 1-C-3/5-C-3 | L* | 36.95 | 34.35 | 32.82 | 29.54 | 26.75 | 58.31 | 55.10 | 50.64 | 45.75 | 38.63 |
| | a* | −2.49 | −1.12 | −0.64 | 0.14 | 0.57 | −3.17 | −3.15 | −2.98 | −3.17 | −3.58 |
| | b* | −0.69 | −1.43 | −2.47 | −3.27 | −5.09 | −2.85 | −4.72 | −7.49 | −10.65 | −16.14 |
| 1-C-3/2-C-3 | L* | −36.95 | −35.43 | 34.57 | 34.12 | 32.67 | 58.31 | 56.65 | 54.79 | 52.82 | 50.85 |
| | a* | −2.49 | −0.92 | −0.22 | 0.77 | 1.03 | −3.17 | −2.03 | −0.93 | 0.54 | 1.92 |
| | b* | −0.69 | 1.63 | 4.20 | 7.78 | 12.26 | −2.85 | 0.66 | 5.23 | 11.62 | 20.93 |
| 1-C-3/3-C-3 | L* | 36.95 | 35.22 | 33.14 | 30.25 | 28.24 | 58.31 | 55.23 | 51.55 | 46.89 | 40.40 |
| | a* | −2.49 | −0.30 | 1.27 | 3.27 | 5.38 | −3.17 | −1.03 | 1.73 | 5.89 | 12.12 |
| | b* | −0.69 | 0.33 | 2.03 | 3.82 | 6.24 | −2.85 | −1.91 | −0.70 | 0.87 | 3.23 |
| 1-C-3/5-C-3 | L* | 36.95 | 35.29 | 35.29 | 34.57 | 34.05 | 58.31 | 56.79 | 55.11 | 53.41 | 50.72 |
| | a* | −2.49 | −2.41 | −2.11 | −1.45 | −2.36 | −3.17 | −4.33 | −5.79 | −7.53 | −10.50 |
| | b* | −0.69 | 0.59 | 2.06 | 3.62 | 5.58 | −2.85 | −0.55 | 2.31 | 6.07 | 11.90 |

[Color Mixing]

Paints were produced by the same method as the preferred embodiment by employing the pigments of the preferred embodiment sample Nos. 1-C-3 (silver), 2-C-3 (gold), 3-C-3 (red), 5-C-3 (blue), 6-C-3 (green). Then, the respective paints were mixed at the pigment ratios shown in Table 5. In the column of 'Ratio of Mixture', A:3-C-3/6-C-3=50/50, B:6-C-3/5-C-3=50/50, C:3-C-3/5-C-3=50/50, D:2-C-3/5-C-3=50/50, E:3-C-3/2-C-3=50/50, and F:6-C-3/2-C-3=50/50. The mixed paints were applied on art papers with a 25 mil-applicator, and then baked and dried. The colors of the obtained paint film were measured by the same method as described in the above Colorimetry section. Table 6 shows the results of the measurement.

In the pigment of the preferred embodiment, various colors can be obtained only by changing the thickness of the titanium dioxide layer, and mixtures of these pigments offer total color variation. Because various colors can be attained only by light interference, the color mixing is made by additive mixture. Thus, clear colors free from turbidness can be produced. Moreover, as any color can be produced only by mica pigment, there is no fear for color separation. In addition, since the pigment of the present invention can be dispersed only by stirring, there is no need to employ the complicated dispersing steps employed in the conventional methods, and the man-hour requirement for producing paints are remarkably reduced.

Obviously, many modifications and variations of the present invention are possible in the light of the above teachings. It is therefore to be understood that within the scope of the appended claims, the invention may be practiced otherwise than as specifically described.

What is claimed is:

1. A pigment comprising:
   a substrate;
   a transparent inorganic compound layer formed on a surface of said substrate; and
   a metallic layer having metallic luster formed in a scattered manner on an interface between said substrate and said transparent inorganic compound layer,
   whereby said pigment produces color by light interference of a ray reflected on a surface of said transparent inorganic compound layer and a ray passed through said transparent inorganic compound layer and reflected on a surface of said metallic layer.

2. A pigment according to claim 1, wherein said substrate comprises a material selected from the group consisting of natural mica, synthetic mica, glass flakes, and molybdenum disulfide.

3. A pigment according to claim 1, wherein said substrate comprises natural mica or synthetic mica.

4. A pigment according to claim 1, wherein said substrate is of powder shape or scaly shape.

5. A pigment according to claim 1, wherein said substrate is of scaly shape having a thickness of about 0.5–2 μm and a particle diameter of about 50 μm or less.

6. A pigment according to claim 1, wherein said metallic layer is formed on all surfaces of said substrate.

7. A pigment according to claim 1, wherein said metallic layer comprises a material selected from the group consisting of silver, gold, copper, palladium, nickel, cobalt, a nickel-phosphorus alloy, a nickel-boron alloy, a nickel-cobalt-phosphorus alloy, a nickel-tungsten-phosphorus alloy, a silver-gold alloy, and a cobalt-phosphorus alloy.

8. A pigment according to claim 1, wherein said transparent inorganic compound layer comprises a material selected from the group consisting of titanium dioxide, iron oxide, aluminum hydroxide, and chromium hydroxide.

9. A pigment comprising:
   a substrate;
   a transparent inorganic compound layer formed on a surface of said substrate; and
   a metallic layer having metallic luster formed in a scattered manner on an interface between said substrate and said transparent inorganic compound layer,
   wherein said metallic layer is formed in gaps between inorganic compound particles forming said transparent inorganic compound layer and around said inorganic compound particles,
   whereby said pigment produces color by light interference of a ray reflected on a surface of said transparent inorganic compound layer and a ray passed through said transparent inorganic compound layer and reflected on a surface of said metallic layer.

10. A pigment according to claim 1, wherein said substrate is mica; said inorganic compound is titanium dioxide; and said metallic layer comprises a metal selected from the group consisting of silver, gold, copper, palladium, nickel, cobalt, a nickel-phosphorous alloy, a nickel-boron alloy, a nickel-cobalt-phosphorous alloy, a nickel-tungsten-phosphorous alloy, a silver-gold alloy and a cobalt-phosphorous alloy.

11. A pigment according to claim 10, wherein said metal is silver.

* * * * *